(12) United States Patent
Ibrahim et al.

(10) Patent No.: US 12,739,681 B2
(45) Date of Patent: Sep. 15, 2026

(54) GUARD BAND REPORTING FOR A FULL DUPLEX (FD) SLOT

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Wanshi Chen, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 18/350,591

(22) Filed: Jul. 11, 2023

(65) Prior Publication Data

US 2024/0056863 A1 Feb. 15, 2024

Related U.S. Application Data

(60) Provisional application No. 63/396,825, filed on Aug. 10, 2022.

(51) Int. Cl.

| | |
|---|---|
| ***H04W 24/10*** | (2009.01) |
| ***H04L 5/00*** | (2006.01) |
| ***H04L 27/26*** | (2006.01) |
| ***H04W 72/0446*** | (2023.01) |
| *H04L 5/14* | (2006.01) |

(52) U.S. Cl.

CPC .......... *H04W 24/10* (2013.01); *H04L 5/0048* (2013.01); *H04L 27/2607* (2013.01); *H04W 72/0446* (2013.01); *H04L 5/14* (2013.01)

(58) Field of Classification Search

CPC .............. H04W 24/10; H04W 72/0446; H04L 5/0048; H04L 27/2607; H04L 5/14

See application file for complete search history.

(56) References Cited

U.S. PATENT DOCUMENTS

| | | | | |
|---|---|---|---|---|
| 2020/0235980 | A1 * | 7/2020 | John Wilson | H04W 56/001 |
| 2020/0267730 | A1 * | 8/2020 | Kim | H04W 72/0453 |
| 2022/0124531 | A1 * | 4/2022 | Miao | H04L 5/0051 |

FOREIGN PATENT DOCUMENTS

| | | | | |
|---|---|---|---|---|
| WO | WO-2021203374 A1 * | 10/2021 | | H04W 74/0833 |

* cited by examiner

*Primary Examiner* — Samina F Choudhry

(74) *Attorney, Agent, or Firm* — Norton Rose Fulbright US LLP

(57) ABSTRACT

An apparatus for wireless communication by a user equipment (UE) includes a receiver configured to receive a reference signal that is associated with a first full duplex (FD) slot. The apparatus further includes a transmitter configured to transmit a measurement report that is associated with the reference signal. The measurement report includes an indication of a size of a guard band associated with a second FD slot that is subsequent to the first FD slot.

30 Claims, 7 Drawing Sheets

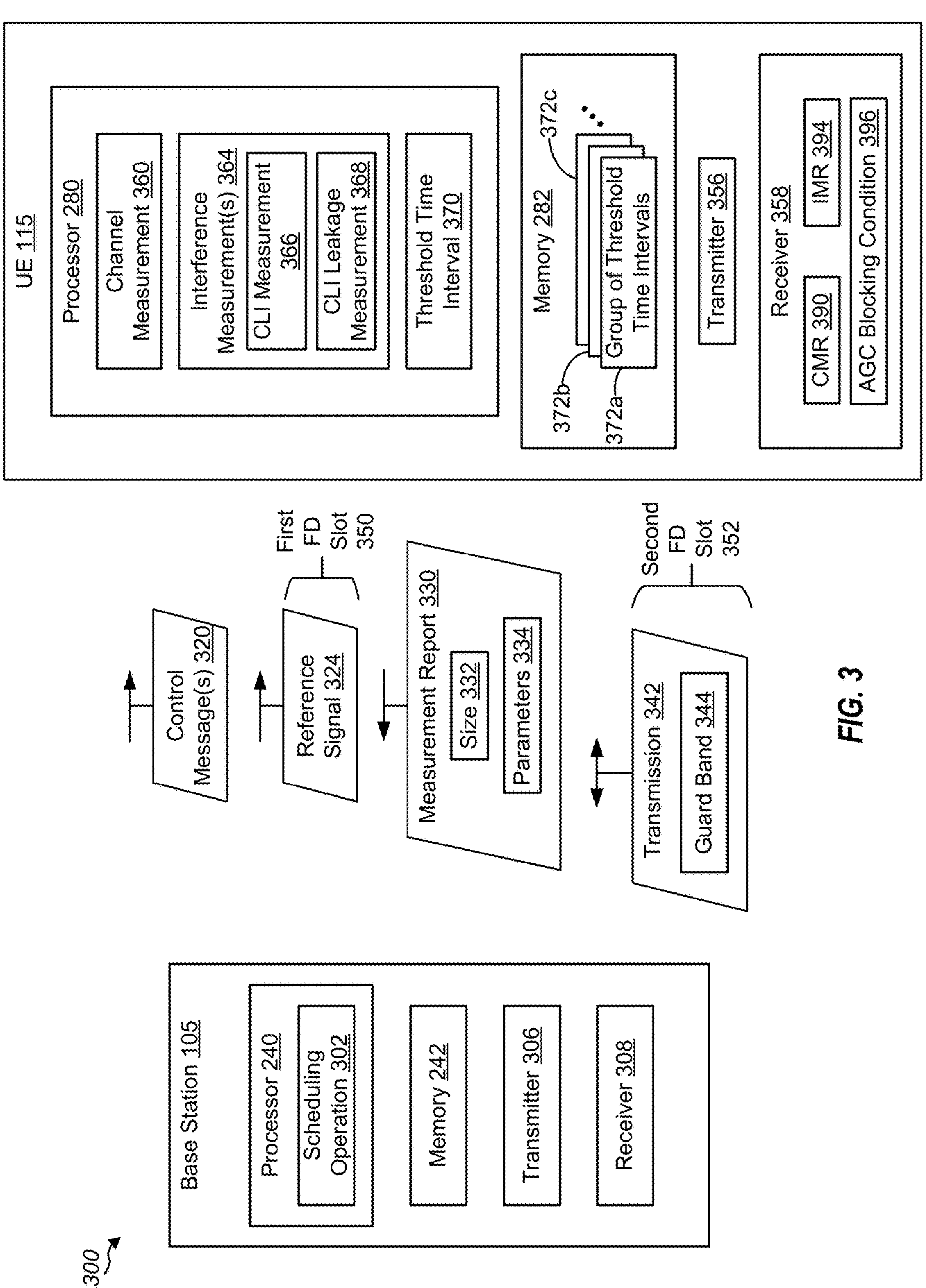

UE 115
Processor 280
Channel Measurement 360
Interference Measurement(s) 364
CLI Measurement 366
CLI Leakage Measurement 368
Threshold Time Interval 370
Memory 282
372c
Group of Threshold Time Intervals
372b
372a
Transmitter 356
Receiver 358
CMR 390
IMR 394
AGC Blocking Condition 396
First FD Slot 350
Second FD Slot 352
Control Message(s) 320
Reference Signal 324
Measurement Report 330
Size 332
Parameters 334
Transmission 342
Guard Band 344
FIG. 3
Base Station 105
Processor 240
Scheduling Operation 302
Memory 242
Transmitter 306
Receiver 308
300

GUARD BAND REPORTING FOR A FULL DUPLEX (FD) SLOT

CROSS-REFERENCE TO RELATED APPLICATIONS

This application claims the benefit of U.S. Prov. Pat. App. No. 63/396,825, entitled "GUARD BAND REPORTING FOR A FULL DUPLEX (FD) SLOT" and filed on Aug. 10, 2022, which is expressly incorporated by reference herein in its entirety.

TECHNICAL FIELD

Aspects of the present disclosure relate generally to wireless communication systems, and more particularly, to wireless communication systems that transmit and receive signals using full duplex (FD) slots that include guard bands.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

For example, to increase the amount or speed of data that is communicated within a wireless communication network, the wireless communication network may use a full duplex (FD) slot. During the FD slot, multiple signals may be transmitted. For example, during the FD slot, a base station may transmit one or more downlink signals to one or more UEs using downlink resources of the FD slot and may receive one or more uplink signals from one or more UEs using uplink resources of the FD slot. Transmitting and receiving multiple signals using a FD slot may be subject to noise and interference in some cases (such as if a downlink signal interferes with an uplink signal), which may reduce performance of the wireless communication system.

BRIEF SUMMARY OF SOME EXAMPLES

In some aspects of the disclosure, an apparatus for wireless communication by a user equipment (UE) includes a receiver configured to receive a reference signal that is associated with a first full duplex (FD) slot. The apparatus further includes a transmitter configured to transmit a measurement report that is associated with the reference signal. The measurement report includes an indication of a size of a guard band associated with a second FD slot that is subsequent to the first FD slot.

In some other aspects of the disclosure, a method of wireless communication performed by a UE includes receiving a reference signal that is associated with a first FD slot. The method further includes transmitting a measurement report that is associated with the reference signal. The measurement report includes an indication of a size of a guard band associated with a second FD slot that is subsequent to the first FD slot.

In some other aspects of the disclosure, an apparatus for wireless communication by a network device includes a transmitter. The apparatus further includes a receiver configured to receive a measurement report that is based on one or more measurements associated with a first FD slot. The measurement report includes an indication of a size of a guard band associated with a second FD slot that is subsequent to the first FD slot. One or more of the transmitter or the receiver are further configured to perform a wireless communication operation associated with the second FD slot, and the second FD slot includes a guard band having the size.

In some other aspects of the disclosure, a method of wireless communication performed by a network device includes receiving a measurement report that is based on one or more measurements associated with a first FD slot. The measurement report includes an indication of a size of a guard band associated with a second FD slot that is subsequent to the first FD slot. The method further includes performing a wireless communication operation associated with the second FD slot. The second FD slot includes a guard band having the size.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a block diagram illustrating an example wireless communication system that supports guard band reporting according to one or more aspects.

Like reference numbers and designations in the various drawings indicate like elements.

DETAILED DESCRIPTION

Figure 1:
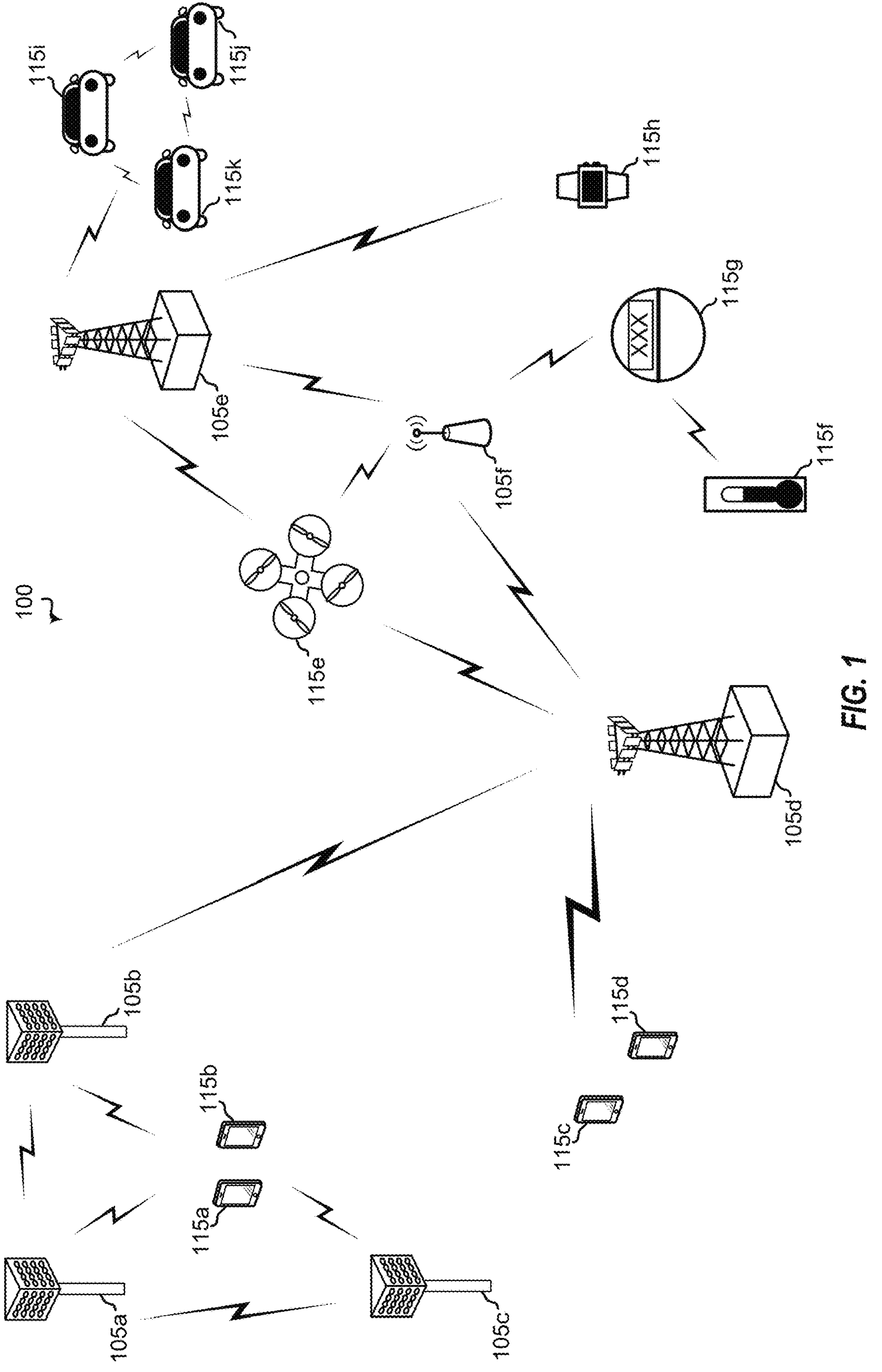
FIG. 1 is a block diagram illustrating details of an example wireless communication system according to one or more aspects.

In some aspects of the disclosure, a user equipment (UE) may perform measurements based on a reference signal that is associated with a first full duplex (FD) slot. Based on the measurements, the UE may determine a size of a guard band for a second FD slot. For example, the UE may select the size of the guard band that increases or maximizes data throughput associated with the second FD slot.

The UE may report the size of the guard band to a base station to enable the base station to perform resource scheduling associated with the second FD slot. For example, the UE may transmit a measurement report to the base station indicating the size of the guard band. In some examples, the reference signal corresponds to a channel state information (CSI) reference signal (CSI-RS), and the measurement report corresponds to a CSI measurement report. In some other examples, the reference signal corresponds to a cross-link interference (CLI) reference signal (CLI-RS), and the measurement report corresponds to a CLI measurement report.

By reporting the size of the guard band determined by the UE, resource allocation efficiency associated with an FD slot may be increased while reducing interference or "leakage" from an uplink sub-band to a downlink sub-band (or vice versa). For example, in some cases, an amount of noise or interference detectable by the base station may differ from an amount of noise or interference detectable by the UE, such as in cases where a distance between the base station and the UE is relatively large. As a result, the UE may dynamically determine a size of the guard band that increases or maximizes throughput based on current channel and interference conditions, which may reduce or avoid interference or leakage (which may result from a guard band size that is too small for the current channel and interference conditions) without allocating a larger number of resources to the guard band than necessary to achieve a particular throughput (which can reduce an amount of resources available for other signals, such as downlink signal). As a result, performance is enhanced.

In various implementations, one or more features described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations **105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f*** is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water infrastructure, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
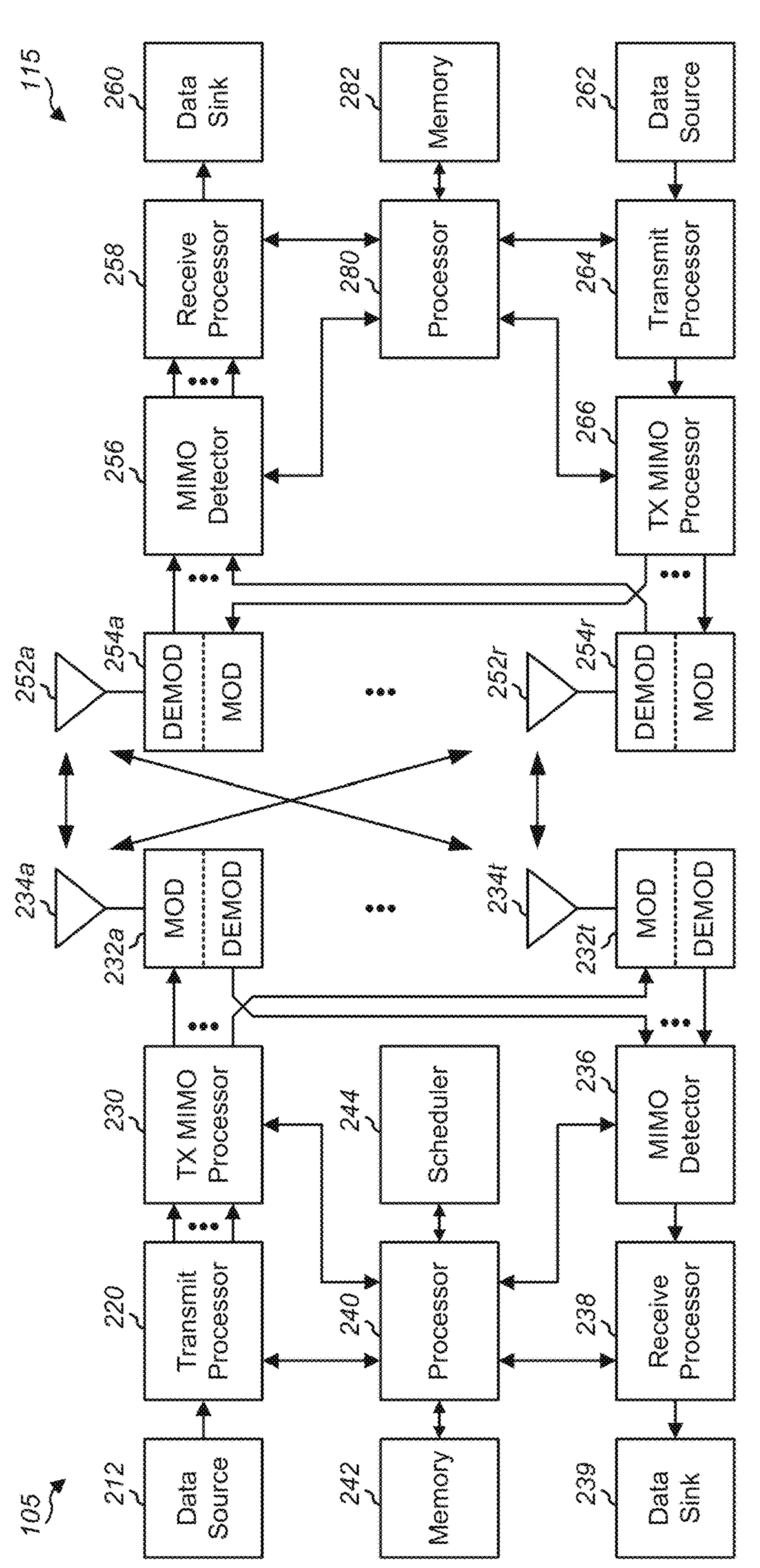
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from processor 240. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as to perform or direct the execution illustrated in FIGS. 6 and 7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

FIG. 3 is a block diagram illustrating an example of a wireless communication system 300 that supports guard band reporting according to some aspects of the disclosure. The wireless communication system 300 may include one or more base stations, such as the base station 105. The wireless communication system 300 may include multiple UEs, such as the UE 115.

The base station 105 may include one or more processors (such as the processor 240), one or more memories (such as the memory 242), a transmitter 306, and a receiver 308. The processor 240 may be coupled to the memory 242, to the transmitter 306, and to the receiver 308. In some examples, the transmitter 306 and the receiver 308 may include one or more components described with reference to FIG. 2, such as one or more of the modulator/demodulators 232*a-t*, the MIMO detector 236, the receive processor 238, the transmit processor 220, or the TX MIMO processor 230. In some implementations, the transmitter 306 and the receiver 308 may be integrated in one or more transceivers of the base station 105.

The transmitter 306 may be configured to transmit reference signals, synchronization signals, control information, and data to one or more other devices, and the receiver 308 may be configured to receive reference signals, control information, and data from one or more other devices. For example, the transmitter 306 may be configured to transmit signaling, control information, and data to the UE 115, and the receiver 308 may be configured to receive signaling, control information, and data from the UE 115.

The UE 115 may include one or more processors (such as the processor 280), a memory (such as the memory 282), a transmitter 356, and a receiver 358. The processor 280 may be coupled to the memory 282, to the transmitter 356, and to the receiver 358. In some examples, the transmitter 356 and the receiver 358 may include one or more components described with reference to FIG. 2, such as one or more of the modulator/demodulators 254*a-r*, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to the base station 105, and the receiver 358 may receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

The wireless communication system 300 may use wireless communication channels, which may be specified by one or more wireless communication protocols, such as a 5G NR wireless communication protocol. To illustrate, the base station 105 may communicate with the UE 115 using one or more downlink wireless communication channels (e.g., using one or more of a PDSCH or a PDCCH). The UE 115 may communicate with the base station 105 using one or more uplink wireless communication channels (e.g., using one or more of a PUSCH or a PUCCH).

During operation, the base station 105 may provide the UE 115 with one or more measurement reporting configurations. For example, the base station 105 may transmit one or more control messages 320 to the UE 115 indicating the measurement reporting configurations. The one or more measurement reporting configurations may include one or more of a channel state information (CSI) reporting measurement configuration, a cross-link interference (CLI) measurement reporting configuration, or another measurement reporting configuration.

The UE 115 may receive a reference signal 324. In some examples, the reference signal 324 is transmitted by the base station 105. For example, the reference signal 324 may correspond to a CSI reference signal (CSI-RS) transmitted by the base station 105. In some other examples, the reference signal 324 may be transmitted by another device. For example, the reference signal 324 may correspond to a CLI reference signal (CLI-RS) transmitted by a second UE.

The UE 115 may perform one or more measurements based on the reference signal 324. For example, the one or more measurements may include a channel measurement 360. Alternatively or in addition, the one or more measurements may include one or more interference measurements 364, such as one or more of a CLI measurement 366 or a CLI leakage measurement 368. In some examples, the base station 105 may transmit the reference signal 324 using wireless resources indicated by a measurement reporting configuration specified by the one or more control messages 320. The wireless resources may include one or more of channel measurement resources (CMR), interference measurement resources (IMR), or other resources.

The reference signal 324 may be associated with a first full duplex (FD) slot 350. For example, during the first FD slot 350, the base station 105 may receive one or more uplink signals and may also transmit one or more downlink signals. In some examples, the first FD slot 350 may correspond to a sub-band full duplex (SB-FD) slot in which the one or more uplink signals are transmitted via the same time resources as the one or more downlink signals and via different frequency resources than the one or more downlink signals.

Based on the reference signal 324, the UE 115 may perform one or more measurements or operations to determine a size 332 of a guard band 344 associated with a second FD slot 352 that is subsequent to the first FD slot 350. For example, the UE 115 may measure multiple values of a throughput parameter based on (e.g., as a function of) different sizes of the guard band 344. For example, the UE 115 may adjust the different sizes of the guard band 344 and may measure corresponding differences in throughput of the reference signal 324. The UE 115 may identify the greatest value from among the multiple values. The UE 115 may identify the size 332 from among the different sizes based on the size 332 corresponding to the greatest value of the throughput parameter.

To further illustrate, in some implementations, the UE 115 may determine an interference plus noise covariance matrix (Rnn) in multiple different resource blocks (RBs). The interference plus noise covariance matrix may represent or may be based on an impact of noise and interference at the UE 115. The UE 115 may determine a whitening matrix based on the interference plus noise covariance matrix and may use the whitening matrix to determine a data rate for a particular number of resources. The particular number of resources may depend on the size 332 (e.g., where an increase in the size 332 decreases the particular number of resources, and where a decrease in the size 332 increases the particular number of resources). The UE 115 may multiply the whitening matrix with a channel estimate (which may be based on or which may correspond to the channel measurement 360) to determine an achievable data rate (or throughput). Accordingly, the UE 115 may determine an achievable data rate (or throughput) for multiple different sizes of the guard band 344 and may select the size 332 from among the multiple different sizes based on the size 332 increasing an achievable data rate (or throughput) as compared to the other sizes of the guard band 344.

The UE 115 may transmit a measurement report 330 to the base station 105 based on the reference signal 324. The measurement report 330 may include an indication of the size 332 of the guard band 344. For example, the base station 105 may schedule, based on the size 332, a transmission 342 during the second FD slot 352. The transmission 342 may include an uplink signal (which may be transmitted to the base station 105 by the UE 115 or another UE) and may further include a downlink signal (which may be transmitted by the base station 105 to the UE 115 or another UE). The uplink signal may be separated from the downlink signal based on the guard band 344 having the size 332. For example, uplink resources associated with the uplink signal may be separated from (and may be non-contiguous with) downlink resources associated with the downlink signal based on the guard band 344, and an amount of the separation (e.g., a number of resources separating the uplink resources from the downlink resources) may correspond to the size 332.

In some examples, the size 332 may correspond to a number of frequency resources, a number of hertz (Hz), or a number of RBs, as illustrative examples. Further, in some examples, the size 332 may be zero. In this case, an uplink signal associated with the second FD slot 352 may be associated with a frequency resource that is adjacent to a frequency resource associated with a downlink signal associated with the second FD slot 352. In another example, the size 332 may be negative. In this case, the uplink signal and the downlink signal may share one or more frequency resources (e.g., one or more resources associated with the uplink signal may at least partially overlap one or more resources associated with the downlink signal).

In some implementations, the reference signal 324 may correspond to a CSI-RS (which may be transmitted by the base station 105), and the measurement report 330 may correspond to a CSI measurement report. In some such examples, the measurement report 330 may further indicate the channel measurement 360.

In some other implementations, the reference signal 324 may correspond to a CLI-RS (which may be transmitted by a second UE), and the measurement report 330 may correspond to a CLI measurement report. In some examples, the base station 105 may configure the UE 115 with one or more CLI measurement resources and may trigger the one or more interference measurements 364 to be performed using the one or more CLI measurement resources. In some such examples, the measurement report 330 may further indicate the one or more interference measurements 364, such as one or more of the CLI measurement 366 or the CLI leakage measurement 368.

Figure 4:
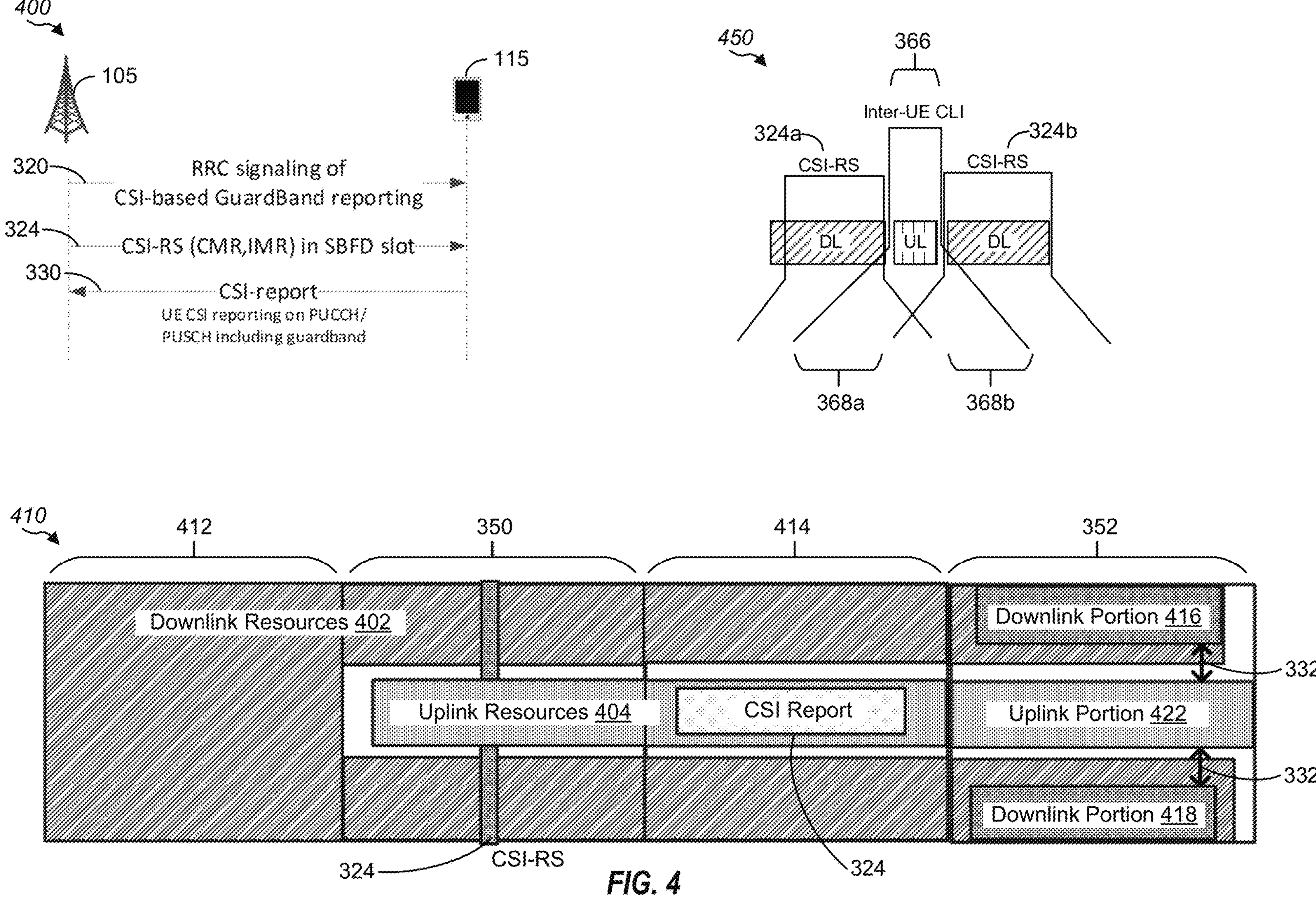
FIG. 4 is a diagram illustrating some examples of guard band reporting according to one or more aspects.

FIG. 4 is a diagram illustrating some examples of guard band reporting according to one or more aspects. FIG. 4 illustrates an example of a ladder diagram 400 in which the one or more control messages 320 may include radio resource control (RRC) signaling of CSI-based guard band reporting. The ladder diagram 400 also illustrates that the reference signal 324 may correspond to a CSI-RS, which may be transmitted in an SB-FD slot. The ladder diagram 400 further illustrates that the measurement report 330 may correspond to a CSI report indicating the size 332 and may be transmitted by the UE 115 using a PUCCH or PUSCH.

FIG. 4 also illustrates an example of a transmission scheme 410. In the transmission scheme 410, the reference signal 324 may correspond to a CSI-RS, and the measurement report 330 may correspond to a CSI report. The transmission scheme 410 includes downlink resources 402 available for downlink scheduling and uplink resources 404 available for uplink scheduling.

The transmission scheme 410 may include a downlink slot 412, the first FD slot 350, a SB-FD slot 414, and the second FD slot 352. The second FD slot 352 may be associated with a downlink portion 416, an uplink portion 422, and a downlink portion 418. The size 332 may correspond to a number of frequency resources separating the downlink portion 416 from the uplink portion 422, a number of frequency resources separating the uplink portion 422 from the downlink portion 418, or both.

FIG. 4 also illustrates an example of a measurement 450 that may be performed by the UE 115. In some examples, the measurement 450 may be performed during or based on the first FD slot 350 and based on the reference signal 324. In the example of the measurement 450, the reference signal 324 may correspond to a CSI-RS.

The measurement 450 may include performing the CLI measurement 366, such as by measuring an amount of inter-UE interference from the middle of the UL sub-band to the edge of a lower band 324*a* associated with the reference signal 324 and from the middle of the UL sub-band to the edge of an upper band 324*b* associated with the reference signal 324. Alternatively or in addition, the measurement 450 may include performing the CLI leakage measurement 368, such as by measuring one or both of an amount of energy leakage 368*a* from the inter-UE CLI to the lower band 324*a* or an amount of energy leakage 368*b* from the inter-UE CLI to the upper band 324*b*.

Figure 5:
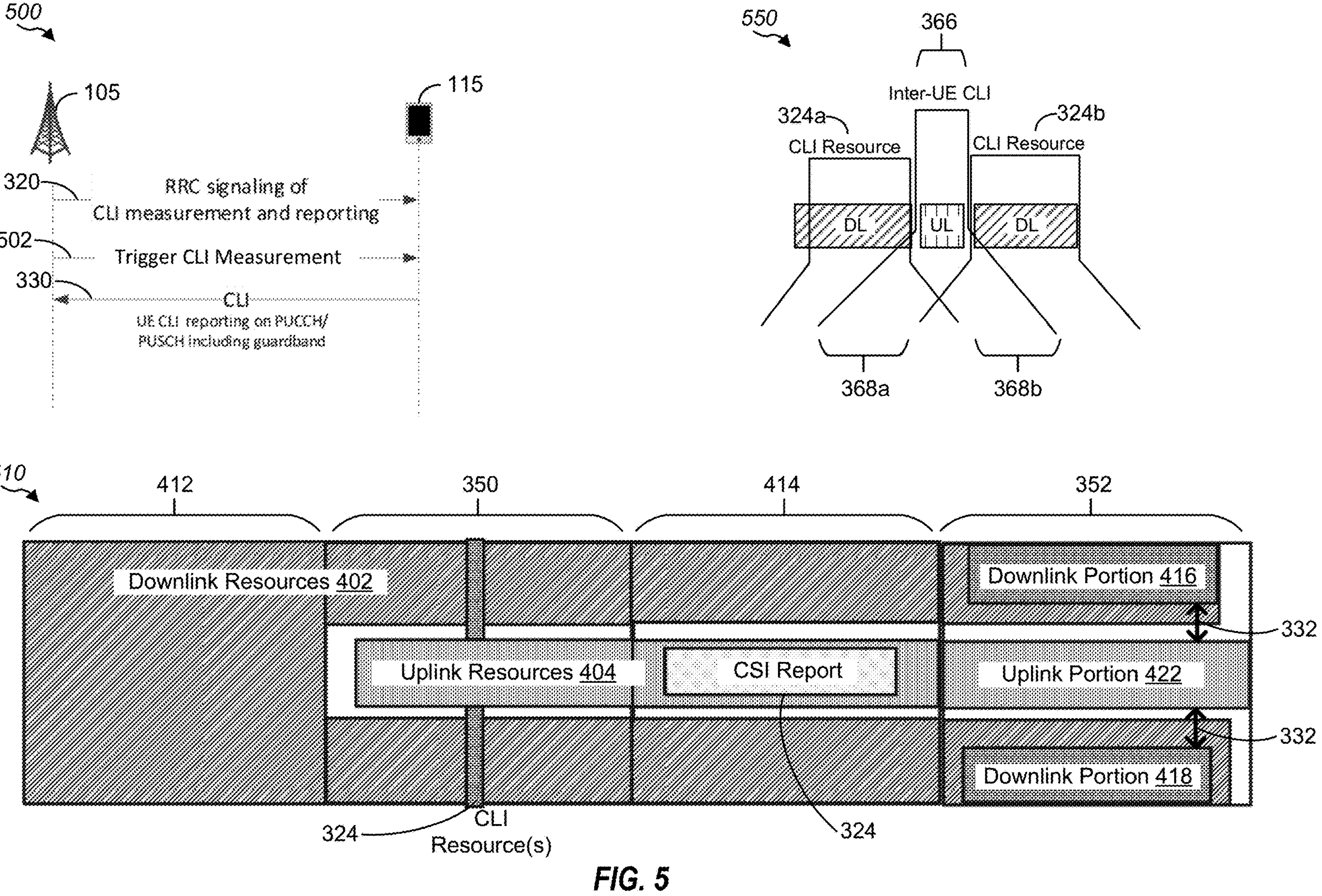
FIG. 5 is another diagram illustrating some examples of guard band reporting according to one or more aspects.

FIG. 5 is a diagram illustrating some examples of guard band reporting according to one or more aspects. FIG. 5 illustrates an example of a ladder diagram 500 in which the one or more control messages 320 may include radio resource control (RRC) signaling of CLI measurement and reporting. The base station 105 may configure the UE 115 with a CLI measurement resource. The ladder diagram 500 also illustrates that the base station 105 may trigger CLI measurement based on the CLI measurement resource, at 502. The reference signal 324 may correspond to the CLI measurement resource, which may be located in an SB-FD slot. The ladder diagram 500 further illustrates that the measurement report 330 may correspond to a CLI report that indicates the size 332 and may be transmitted by the UE 115 using a PUCCH or PUSCH.

FIG. 5 also illustrates an example of a transmission scheme 510. In the transmission scheme 510, the reference signal 324 may correspond to a CLI-RS associated with one or more CLI resources, and the measurement report 330 may correspond to a CLI report.

The transmission scheme 510 may include the downlink slot 412, the first FD slot 350, the SB-FD slot 414, and the second FD slot 352. The second FD slot 352 may be associated with the downlink portion 416, the uplink portion 422, and the downlink portion 418. The size 332 may correspond to a number of frequency resources separating the downlink portion 416 from the uplink portion 422, a number of frequency resources separating the uplink portion 422 from the downlink portion 418, or both.

FIG. 5 also illustrates an example of a measurement 550 that may be performed by the UE 115. In some examples, the measurement 550 may be performed during or based on the first FD slot 350 and based on a triggered measurement resource. In the example of the measurement 550, the reference signal 324 may correspond to CLI resources associated with a CLI-RS.

The measurement 550 may include performing the CLI measurement 366, such as by measuring an amount of inter-UE interference from the middle of the UL sub-band to the edge of the lower band 324*a* and from the middle of the UL sub-band to the edge of the upper band 324*b*. Alternatively or in addition, the measurement 550 may include performing the CLI leakage measurement 368, such as by measuring one or both of the amount of energy leakage 368*a* from the inter-UE CLI to the lower band 324*a* or the amount of energy leakage 368*b* from the inter-UE CLI to the upper band 324*b*.

The examples of FIGS. 4 and 5 illustrate that the same size 332 may be used for multiple guard bands of a FD slot, such as for a guard band separating the downlink portion 416 from the uplink portion 422 and for a guard band separating the uplink portion 422 from the downlink portion 418. Such an example may be referred to as a symmetric implementation. Other examples are also within the scope of the disclosure. For example, different sizes may be used for a guard band separating the downlink portion 416 from the uplink portion 422 and for a guard band separating the uplink portion 422 from the downlink portion 418. Such an example may be referred to as an asymmetric implementation.

Further, although the examples of FIGS. 4 and 5 illustrate that the second FD slot 352 may include one uplink portion 422 and two downlink portions 416, 418, in other examples, a slot may have a different configuration than illustrated. For example, the second FD slot 352 may include two or more uplink portions. Alternatively or in addition, the second FD slot 352 may include one downlink portion or three or more downlink portions.

Referring again to FIG. 3, in some implementations, the indication of the size 332 may be separate from other parameters 334 indicated by the measurement report 330. To illustrate, a format associated with the measurement report 330 may specify a separate field or quantity for reporting of the size 332 that is separate from other fields or quantities for reporting the other parameters 334. In some other examples, the indication of the size 332 may be reported with at least one other parameter of the other parameters 334. For example, the measurement report 330 may include a value that represents both the size 332 and the at least one other value.

To further illustrate, in some examples, the measurement report 330 may correspond to a CSI measurement report, and the other parameters 334 may include one or more of a precoding matrix indicator (PMI), a rank indicator (RI), a channel quality indicator (CQI), or a length indicator (LI). In some other examples, the measurement report 330 may correspond to a CLI measurement report, and the other parameters 334 may include one or more of a received signal strength indicator (RSSI), a reference signal received power (RSRP), or a signal to interference plus noise ratio (SINR).

In some examples, the measurement report 330 may indicate channel measurement resources (CMR) 390 used by the UE 115 to perform the channel measurement 360. To illustrate, the UE 115 may perform the channel measurement 360 based on the CMR 390, may perform the one or more interference measurements 364 based on channel measurement 360, and may determine the size 332 based at least in part on the one or more interference measurements 364. In such examples, the UE 115 may use the CMR 390 to determine both the channel measurement 360 and the one or more interference measurements 364.

In some other examples, the measurement report 330 may indicate the CMR 390 used by the UE 115 to perform the channel measurement 360 and may further indicate interference measurement resources (IMR) 394 used by the UE 115 to perform the one or more interference measurements 364. To illustrate, the UE 115 may perform the channel measurement 360 based on the CMR 390, may perform the one or more interference measurements 364 based on the IMR 394, and may determine the size 332 based at least in part on the one or more interference measurements 364.

To further illustrate, in some examples, the CMR 390 may include one or more non-zero power (NZP) CSI-RS resources used by the UE 115 to perform one or more operations associated with the one or more interference measurements 364, such as an SINR measurement operation or an interference plus noise covariance matrix (Rnn) estimation operation. In some examples, a resource setting associated with the reference signal 324 may include non-contiguous CSI-RS resources.

In some implementations, one or more resources associated with the guard band 344 may be "borrowed" from downlink resources associated with the second FD slot 352, such as by "borrowing" one or more resources from the downlink resources 402. For example, a first increase in the size 332 of the guard band 344 may be associated with a first decrease in a downlink size associated with the second FD slot 352 (such as a downlink size of the downlink portion 416 or a downlink size of the downlink portion 418), and a second decrease in the size 332 of the guard band 344 may be associated with a second increase in the downlink size. To further illustrate, in some examples, the second FD slot 352 may include one downlink sub-band, and the downlink size may correspond to a particular quantity of resources minus a quantity of resources associated with the guard band 344. In some other examples, the second FD slot 352 may include two downlink sub-bands, and the downlink size corresponds to a particular quantity of resources minus a quantity of resources associated with the guard band 344 times two.

In some examples, the base station 105 and the UE 115 may operate based on a wireless communication protocol that specifies a plurality of values representing sizes of the guard band 344. The UE 115 may select a particular value from the plurality of values as the indication of the size 332 of the guard band 344. For example, the wireless communication protocol may specify a list of "allowed" sizes of the guard band 344 corresponding to the plurality of values.

In some other examples, the base station 105 may configure the UE 115 with a plurality of guard band configurations for the UE 115. For example, a control message of the one or more control messages 320 may indicate the plurality of guard band configurations. The UE 115 may select a particular guard band configuration from the plurality of guard band configurations as the indication of the size 332 of the guard band 344. In such examples, the base station 105 may configure the UE 115 with different "allowed" sizes of the guard band 344.

In some implementations, the size 332 may be selected from multiple different sizes, such as different numbers of resource blocks (RBs) (e.g., 0 RBs, 5 RBs, and 10 RBs). For example, the UE 115 may be configured with a plurality of values representing sizes of the guard band 344, and the indication of the size 332 may correspond to a particular value of the plurality of values (such as 0 RBs, 5 RBs, or 10 RBs).

In some other implementations, the size 332 may be selected from a range, such as a range from 0 RBs to 20 RBs. In such examples, the UE 115 may be configured with a range of values representing sizes of the guard band 344, and the indication of the size 332 may correspond to a particular value within the range of values. A granularity associated with the range of values with the range of values may be specified by a wireless communication protocol or may be configured by the base station 105 (e.g., via the one or more control messages 320). To illustrate, if the range of values corresponds to 0 RBs to 20 RBs, and if the granularity corresponds to one RB, then the size 332 may correspond to 0, 1, 2, 3, . . . 20 RBs. In another example, if the range of values corresponds to 0 RBs to 20 RBs, and if the granularity corresponds to five RBs, then the size 332 may correspond to 0, 5, 10, 15, or 20 RBs.

In some circumstances, determination of the size 332 of the guard band 344 by the UE 115 may increase or may involve latency, such as by increasing number of receive operations, processing computations, or other operations performed by the UE 115. To compensate for such latency, the UE 115 may be configured with a threshold time interval 370 for determination of the size 332 of the guard band 344. The UE 115 may transmit the measurement report 330 after the threshold time interval 370. For example, the threshold time interval 370 may initiate upon a trigger event, such as receipt of the reference signal 324. During the threshold time interval 370, the UE 115 may determine the size 332 of the guard band 344. Based on expiration of the threshold time interval 370, the UE 115 may transmit the measurement report 330.

In some examples, the threshold time interval 370 may be "relaxed" or increased as compared to one or more other threshold time intervals associated with measurement reporting (such as compared to another threshold time interval associated with a measurement report that does not report a guard band size). To illustrate, the threshold time interval 370 may be greater than each threshold time interval in a first group **372*a*** of threshold time intervals associated with a first latency characteristic. The first latency characteristic may correspond to a "low-latency class" specified by a wireless communication protocol, such as a Z1 latency class specified by a 5G NR wireless communication protocol.

In some examples, the threshold time interval 370 is selected from a second group **372*b* of threshold time intervals associated with a second latency characteristic or from a third group 372*c*** of threshold time intervals associated with beam reporting. The second latency characteristic may be greater than the first latency characteristic. For example, the second latency characteristic may correspond to a "high-latency class" specified by a wireless communication protocol, such as a Z2 latency class specified by a 5G NR wireless communication protocol. In this example, devices associated with the Z2 latency class may be associated with a "relaxed" or increased time interval for measurement reporting as compared to devices of the Z1 latency class.

The third group **372*c* may be specified by a wireless communication protocol and may be used for reporting beam data, such as the results of a beam sweep operation performed by the UE 115. In some examples, the third group 372*c* may be based on a UE capability associated with the UE 115. For example, the UE 115 may provide the base station 105 with UE capability information (such as an antenna configuration associated with the UE 115), and the base station 105 may configure the UE 115 with the third group 372***c* based on the UE capability information (e.g., via the one or more control messages 320).

In some examples, the UE 115 may select among the second group 372*b* and the third group 372*c* based on one or more of CSI reporting quantity associated with the measurement report 330 or a reporting type associated with the measurement report 330. For example, the UE 115 may select the size 332 either from the second group 372*b* or from the third group 372*c* based on a first CSI reporting quantity of the measurement report 330 or based on a second CSI reporting quantity of the measurement report 330, respectively, where the second CSI reporting quantity is different than the first CSI reporting quantity. As another example, the UE 115 may the UE 115 may select the size 332 either from the second group 372*b* or from the third group 372*c* based on a first reporting type of the measurement report 330 or based on a second reporting type of the measurement report 330, respectively, where the second reporting type is different than the first reporting type.

In some examples, the UE 115 may report multiple sizes of the guard band 344 or parameters associated with multiple sizes of the guard band 344. To illustrate, the one or more control messages 320 may configure the UE 115 with multiple sizes of the guard band 344, and the measurement report 330 may indicate multiple CLI leakage measurements 368 associated with the multiple sizes of the guard band 344. Depending on the implementation, the UE 115 may report the multiple sizes of the guard band 344 either via the measurement report 330 or via multiple measurement reports including the measurement report 330 (and at least one other measurement report).

In some implementations, the UE 115 may report multiple CLI measurements (or CLI "components") to the base station 105. For example, the multiple CLI measurements may include a CLI measurement 366 associated with an uplink sub-band of the first FD slot 350, such as the uplink sub-band of the first FD slot 350 as illustrated in the examples of FIGS. 4 and 5. The multiple CLI measurements 366 may further include a CLI leakage measurement 368 associated with a downlink sub-band of the first FD slot 350, such as one or both of the downlink sub-bands of the first FD slot 350 as illustrated in the examples of FIGS. 4 and 5. Depending on the implementation, the UE 115 may report the multiple CLI measurements either via the measurement report 330 or via multiple measurement reports including the measurement report 330 (and at least one other measurement report).

In some implementations, the UE 115 may perform the CLI measurement 366 based on an uplink sub-band portion of the first FD slot 350 and may report whether the UE 115 detects an AGC blocking condition 396 based on the CLI measurement 366. To illustrate, in some examples, if an amount of inter-UE CLI exceeds a threshold amount, an AGC operation performed by the receiver 358 to receive a downlink signal may be affected by the inter-UE CLI. In such examples, the UE 115 may detect the AGC blocking condition 396 (e.g., by detecting that the CLI measurement 366 exceeds a threshold).

The measurement report 330 may include a field having one of a first value or a second value. The first value may indicate that the UE 115 detects the AGC blocking condition 396, and the second value may indicate that the UE 115 fails to detect the AGC blocking condition 396. In some other examples, the UE 115 may report the AGC blocking condition 396 via one or more of a CLI RSSI associated with an uplink sub-band of the first FD slot 350, a dynamic range reduction, a quantization noise ratio (QNR), or a difference in received power between the uplink sub-band and a downlink sub-band of the first FD slot 350. Depending on the implementation, the UE 115 may report the AGC blocking condition 396 either via the measurement report 330 or via multiple measurement reports including the measurement report 330 (and at least one other measurement report).

The base station 105 may receive the measurement report 330. The base station 105 may perform a scheduling operation 302 associated with the transmission 342 based on the measurement report 330, such as based on the size 332 indicated by the measurement report 330. For example, performing the scheduling operation 302 may include setting allocating resources for the second FD slot 352 so that the guard band 344 has the size 332. To further illustrate, the base station 105 may determine whether to allocate all of the downlink resources 402 within the second FD slot 352 to the downlink portions 416, 418 or to "borrow" at least some of the downlink resources 402 for allocation to the guard band 344.

Alternatively or in addition, the scheduling operation 302 may include performing one or more other operations. For example, the measurement report 330 may indicate the CLI measurement 366 and the CLI leakage measurement 368, and the base station 105 may select a downlink resource allocation (such as a PDSCH resource allocation) for the second FD slot 352 based on the CLI leakage measurement 368 and may adjust an uplink transmit power of the UE 115 (or another UE) based on the CLI measurement 366. In some examples, based on the CLI measurement 366, the base station 105 may determine an impact of an uplink transmit power setting of the UE 115 on a dynamic range associated with the UE 115 (such as a dynamic range of an analog-to-digital (ADC) of the receiver 358). For example, a relatively large CLI measurement 366 associated with an uplink sub-band may indicate a loss of dynamic range associated with the receiver 358, which may lead to increased quantization noise.

The base station 105 may transmit control data based on the scheduling operation 302. For example, the base station 105 may transmit the control data to one or more UEs including the UE 115. The control data may schedule the transmission 342 and may indicate downlink resources on which the UE 115 is to receive downlink data, uplink resources on which the UE 115 is to transmit uplink data, or both. The downlink resources may include resources of the downlink resources 402 that are allocated to the downlink portion 416, resources of the downlink resources 402 that are allocated to the downlink portion 418, or both. The uplink resources may include resources of the uplink resources 404 that are allocated to the uplink portion 422. In some examples, the downlink resources are separated from the uplink resources via the guard band 344 having the size 332.

One or more aspects described herein may improve performance of a wireless communication system. For example, By reporting the size 332 of the guard band 344 determined by the UE 115, resource allocation efficiency associated with an FD slot may be increased while reducing interference or "leakage" from an uplink sub-band to a downlink sub-band (or vice versa). To illustrate, in some cases, an amount of noise or interference detectable by the base station 105 may differ from an amount of noise or interference detectable by the UE 115, such as in cases where a distance between the base station 105 and the UE 115 is relatively large. As a result, the UE 115 may dynamically determine a size 332 that increases or maximizes throughput based on current channel and interference conditions, which may reduce or avoid interference or leakage (which may result from a guard band size that is too small for the current channel and interference conditions) without allocating a larger number of resources to the guard band 344 than necessary to achieve a particular throughput (which can reduce an amount of resources available for other signals, such as downlink signal). As a result, performance is enhanced.

Figures 6, 7:
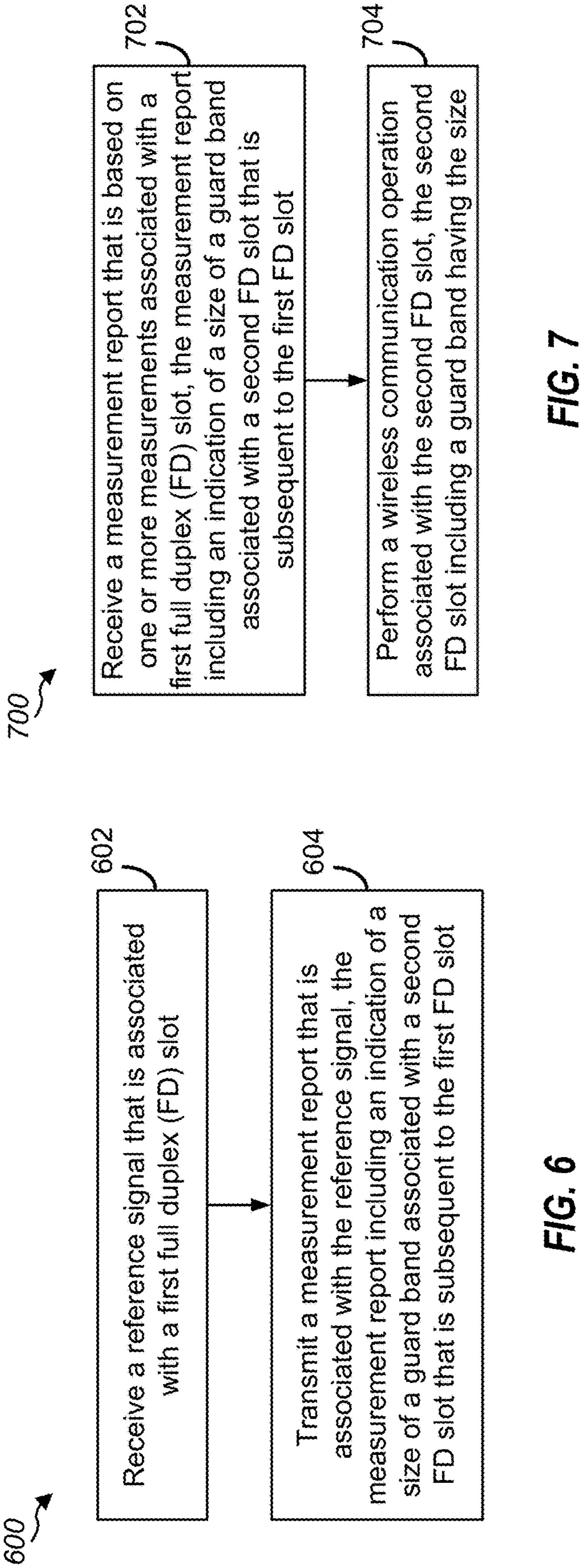
FIG. 6 is a flow diagram illustrating an example of a method of wireless communication performed by a UE that supports guard band reporting according to one or more aspects.
FIG. 7 is a flow diagram illustrating an example of a method of wireless communication performed by a network device that supports guard band reporting according to one or more aspects.

FIG. 6 is a flow diagram illustrating an example of a method 600 of wireless communication performed by a UE that supports guard band reporting according to one or more aspects. In some examples, the method 600 is performed by the UE 115.

The method 600 includes receiving a reference signal that is associated with a first full duplex (FD) slot, at 602. For example, the UE 115 may receive the reference signal 324, and the reference signal 324 may be associated with the first FD slot 350.

The method 600 further includes transmitting a measurement report that is associated with the reference signal, at 604. The measurement report includes an indication of a size of a guard band associated with a second FD slot that is subsequent to the first FD slot. For example, the UE 115 may transmit the measurement report 330 indicating the size 332 of the guard band 344 for the second FD slot 352.

FIG. 7 is a flow diagram illustrating an example of a method 700 of wireless communication performed by a network device that supports guard band reporting according to one or more aspects. In some examples, the network device corresponds to the base station 105.

The method 700 includes receiving a measurement report that is based on one or more measurements associated with a first full duplex (FD) slot, at 702. The measurement report includes an indication of a size of a guard band associated with a second FD slot that is subsequent to the first FD slot. For example, the base station 105 may receive the measurement report 330 indicating the size 332 of the guard band 344 for the second FD slot 352. The measurement report 330 may be based on any of the channel measurement 360 or the one or more interference measurements 364 associated with the first FD slot 350.

The method 700 further includes performing a wireless communication operation associated with the second FD slot, at 704. The second FD slot includes a guard band having the size. For example, the base station 105 may perform the transmission 342 having the guard band 344 during the second FD slot 352.

Figure 8:
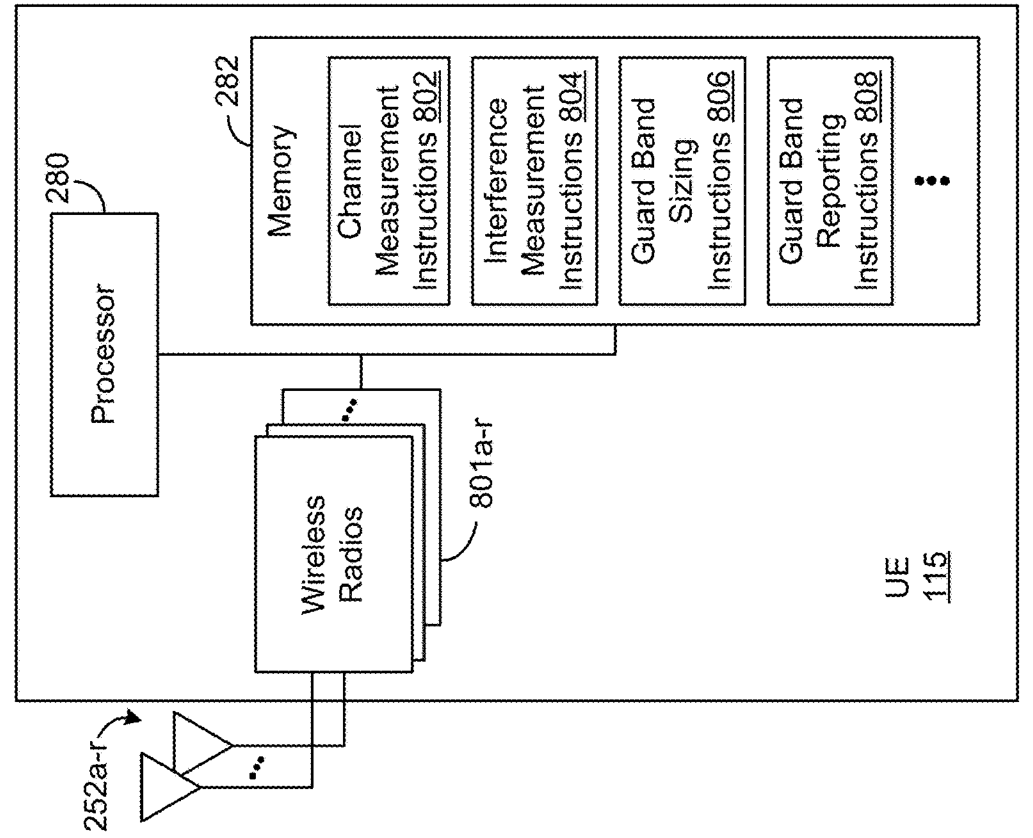
FIG. 8 is a block diagram of an example UE that supports guard band reporting according to one or more aspects.

FIG. 8 is a block diagram illustrating an example of the UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 801*a-r* and antennas 252*a-r*. The wireless radios 801*a-r* may include one or more components or devices described herein, such as the modulator/demodulators 254*a-r*, the MIMO detector 256, the receive processor 258, the transmit processor 264, the TX MIMO processor 266, the transmitter 356, the receiver 358, one or more other components or devices, or a combination thereof.

In some examples, the memory 282 may store instructions executable by one or more processors (e.g., the processor 280) to initiate, perform, or control one or more operations described herein. For example, the memory 282 may store channel measurement instructions 802 executable by the processor 280 to initiate, perform, or control the channel measurement 360. Alternatively or in addition, the memory 282 may store interference measurement instructions 804 executable by the processor 280 to initiate, perform, or control the one or more interference measurements 364. The memory 282 may store guard band sizing instructions 806 executable by the processor 280 to determine the size 332 of the guard band 344. The memory 282 may store guard band reporting instructions 808 executable by the processor 280 to report the size 332 of the guard band 344, such as via the measurement report 330.

Figure 9:
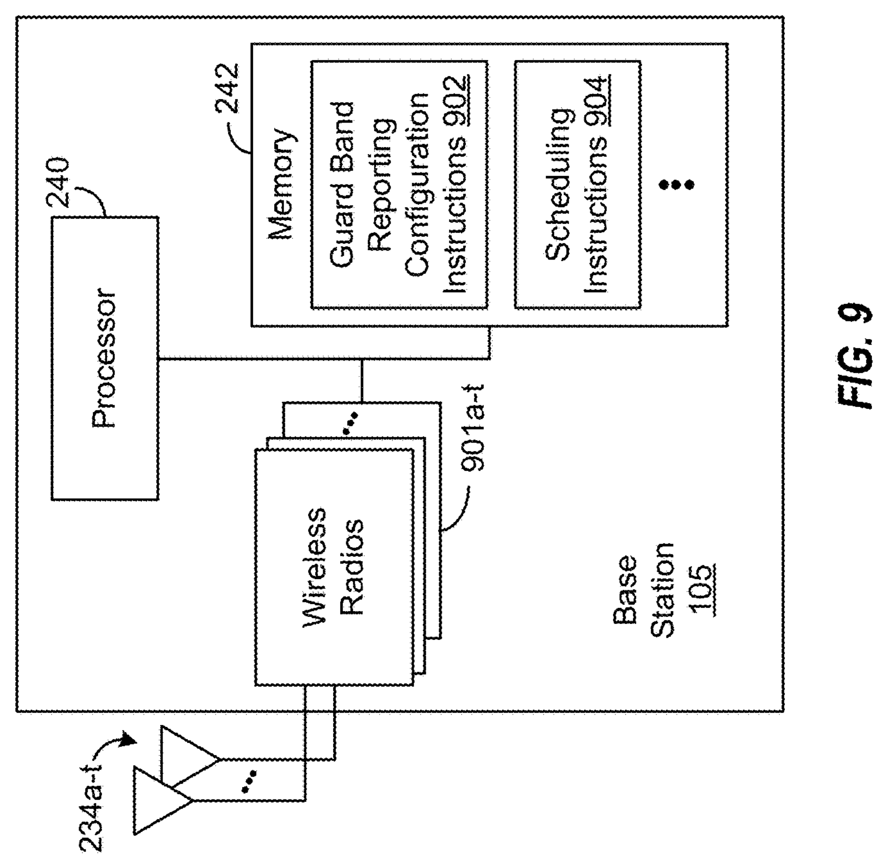
FIG. 9 is a block diagram of an example base station that supports guard band reporting according to one or more aspects.

FIG. 9 is a block diagram illustrating an example of the base station 105 according to some aspects of the disclosure. The base station 105 may include structure, hardware, and components illustrated in FIG. 2. For example, the base station 105 may include the processor 240, which may execute instructions stored in memory 242. Under control of the processor 240, the base station 105 may transmit and receive signals via wireless radios 901*a-t* and antennas 234*a-t*. The wireless radios 901*a-t* may include one or more components or devices described herein, such as the modulator/demodulators 232*a-t*, the MIMO detector 236, the receive processor 238, the transmit processor 220, the TX MIMO processor 230, the transmitter 306, the receiver 308, one or more other components or devices, or a combination thereof.

In some examples, the memory 242 may store instructions executable by one or more processors (e.g., the processor 240) to initiate, perform, or control one or more operations described herein. For example, the memory 242 may store guard band reporting configuration instructions 902 executable by the processor 240 to initiate, perform, or control configuration of the UE 115 with one or more guard band reporting configurations (e.g., via transmission of the one or more control messages 320). The memory 242 may store scheduling instructions 904 executable by the processor 240 to schedule one or more communication operations based on the size 332. For example, the processor 240 may execute the scheduling instructions 904 to perform the scheduling operation 302.

According to some further aspects, in a first aspect, an apparatus for wireless communication by a user equipment (UE) includes a receiver configured to receive a reference signal that is associated with a first full duplex (FD) slot. The apparatus further includes a transmitter configured to transmit a measurement report that is associated with the reference signal. The measurement report includes an indication of a size of a guard band associated with a second FD slot that is subsequent to the first FD slot.

In a second aspect, in combination with the first aspect, the reference signal corresponds to a channel state information (CSI) reference signal (CSI-RS), and the measurement report corresponds to a CSI measurement report.

In a third aspect, in combination with one or more of the first aspect or the second aspect, the reference signal corresponds to a cross-link interference (CLI) reference signal (CLI-RS), and the measurement report corresponds to a CLI measurement report.

In a fourth aspect, in combination with one or more of the first aspect through the third aspect, the indication of the size of the guard band is separate from other parameters indicated by the measurement report.

In a fifth aspect, in combination with one or more of the first aspect through the fourth aspect, the measurement report indicates at least one other parameter, and the indication of the size of the guard band is reported with the at least one other parameter.

In a sixth aspect, in combination with one or more of the first aspect through the fifth aspect, the measurement report further indicates channel measurement resources (CMR), and the apparatus further includes a processor configured to perform a channel measurement associated with the CMR, perform an interference measurement based on the channel measurement, and determine the size of the guard band based at least in part on the interference measurement.

In a seventh aspect, in combination with one or more of the first aspect through the sixth aspect, the measurement report further indicates channel measurement resources (CMR) and interference measurement resources (IMR), and the apparatus further includes a processor configured to perform a channel measurement associated with the CMR, perform an interference measurement associated with the IMR, and determine the size of the guard band based at least in part on the interference measurement.

In an eighth aspect, in combination with one or more of the first aspect through the seventh aspect, a first increase in the size of the guard band is associated with a first decrease in a downlink size associated with the second FD slot, and a second decrease in the size of the guard band is associated with a second increase in the downlink size.

In a ninth aspect, in combination with one or more of the first aspect through the eighth aspect, the second FD slot includes one downlink sub-band, and the downlink size corresponds to a particular quantity of resources minus a quantity of resources associated with the guard band.

In a tenth aspect, in combination with one or more of the first aspect through the ninth aspect, the second FD slot includes two downlink sub-bands, and the downlink size corresponds to a particular quantity of resources minus a quantity of resources associated with the guard band times two.

In an eleventh aspect, in combination with one or more of the first aspect through the tenth aspect, the transmitter and the receiver are further configured to operate based on a wireless communication protocol that specifies a plurality of values representing sizes of the guard band, and a particular value of the plurality of values corresponds to the indication of the size of the guard band.

In a twelfth aspect, in combination with one or more of the first aspect through the eleventh aspect, the receiver is further configured to receive a control message indicating a plurality of guard band configurations, and a particular guard band configuration from the plurality of guard band configurations corresponds to the indication of the size of the guard band.

In a thirteenth aspect, in combination with one or more of the first aspect through the twelfth aspect, the receiver is further configured to receive a configuration of a plurality of values representing sizes of the guard band, and the indication corresponds to a particular value of the plurality of values.

In a fourteenth aspect, in combination with one or more of the first aspect through the thirteenth aspect, the receiver is further configured to receive a range of values representing sizes of the guard band, and the indication corresponds to a particular value within the range of values.

In a fifteenth aspect, in combination with one or more of the first aspect through the fourteenth aspect, the transmitter is further configured to transmit the measurement report after a threshold time interval, and the threshold time interval is greater than each threshold time interval in a first group of threshold time intervals associated with a first latency characteristic.

In a sixteenth aspect, in combination with one or more of the first aspect through the fifteenth aspect, the threshold time interval is included in a second group of threshold time intervals associated with a second latency characteristic greater than the first latency characteristic or in a third group of threshold time intervals associated with beam reporting.

In a seventeenth aspect, in combination with one or more of the first aspect through the sixteenth aspect, one of the second group or the third group is selected based on one or more of channel state information (CSI) reporting quantity associated with the measurement report or a reporting type associated with the measurement report.

In an eighteenth aspect, in combination with one or more of the first aspect through the seventeenth aspect, the threshold time interval is included in a third group of threshold time intervals associated with guard band reporting.

In a nineteenth aspect, in combination with one or more of the first aspect through the eighteenth aspect, the transmitter and the receiver are further configured to operate based on a wireless communication protocol that specifies the third group.

In a twentieth aspect, in combination with one or more of the first aspect through the nineteenth aspect, the third group is based on a UE capability associated with the UE.

In a twenty-first aspect, in combination with one or more of the first aspect through the twentieth aspect, the receiver is further configured to receive a control message configuring the UE with multiple sizes of the guard band, and the measurement report indicates multiple cross-link interference (CLI) leakage measurements associated with the multiple sizes of the guard band.

In a twenty-second aspect, in combination with one or more of the first aspect through the twenty-first aspect, the transmitter is further configured to report multiple cross-link interference (CLI) measurements, and the multiple CLI measurements include a CLI measurement associated with an uplink sub-band of the first FD slot and further include a CLI leakage measurement associated with a downlink sub-band of the first FD slot.

In a twenty-third aspect, in combination with one or more of the first aspect through the twenty-second aspect, the second FD slot includes a downlink resource allocation that is based on the CLI leakage measurement, and an uplink transmit power of the UE or another UE is adjusted based on the CLI measurement.

In a twenty-fourth aspect, in combination with one or more of the first aspect through the twenty-third aspect, the multiple CLI measurements are reported either via the measurement report or via multiple measurement reports including the measurement report.

In a twenty-fifth aspect, in combination with one or more of the first aspect through the twenty-fourth aspect, the transmitter is further configured to report whether an automatic gain control (AGC) blocking condition is detected based on a cross-link interference (CLI) measurement, and the CLI measurement is based on an uplink sub-band portion of the first FD slot.

In a twenty-sixth aspect, in combination with one or more of the first aspect through the twenty-fifth aspect, the measurement report includes a field having one of a first value or a second value. The first value indicates that the UE detects the AGC blocking condition, and the second value indicates that the UE fails to detect the AGC blocking condition.

In a twenty-seventh aspect, in combination with one or more of the first aspect through the twenty-sixth aspect, the transmitter is further configured to report the AGC blocking condition by indicating one or more of a cross link interference (CLI) received signal strength indicator (RSSI) associated with an uplink sub-band of the first FD slot, a dynamic range reduction, a quantization noise ratio (QNR), or a difference in received power between the uplink sub-band and a downlink sub-band of the first FD slot.

In a twenty-eighth aspect, in combination with one or more of the first aspect through the twenty-seventh aspect, the transmitter is further configured to report the AGC blocking condition either via the measurement report or via multiple measurement reports including the measurement report.

In a twenty-ninth aspect, a method of wireless communication performed by a UE includes receiving a reference signal that is associated with a first FD slot. The method further includes transmitting a measurement report that is associated with the reference signal. The measurement report includes an indication of a size of a guard band associated with a second FD slot that is subsequent to the first FD slot.

In a thirtieth aspect, in combination with the twenty-ninth aspect, the reference signal corresponds to a channel state information (CSI) reference signal (CSI-RS), and the measurement report corresponds to a CSI measurement report.

In a thirty-first aspect, in combination with one or more of the twenty-ninth aspect through the thirtieth aspect, the reference signal corresponds to a cross-link interference (CLI) reference signal (CLI-RS), and the measurement report corresponds to a CLI measurement report.

In a thirty-second aspect, in combination with one or more of the twenty-ninth aspect through the thirty-first aspect, the indication of the size of the guard band is separate from other parameters indicated by the measurement report.

In a thirty-third aspect, in combination with one or more of the twenty-ninth aspect through the thirty-second aspect, the measurement report indicates at least one other parameter, and the indication of the size of the guard band is reported with the at least one other parameter.

In a thirty-fourth aspect, in combination with one or more of the twenty-ninth aspect through the thirty-fourth aspect, the measurement report further indicates channel measurement resources (CMR), and the method further includes performing a channel measurement associated with the CMR, performing an interference measurement based on the channel measurement, and determining the size of the guard band based at least in part on the interference measurement.

In a thirty-fifth aspect, in combination with one or more of the twenty-ninth aspect through the thirty-third aspect, the measurement report further indicates channel measurement resources (CMR) and interference measurement resources (IMR), and the method further includes performing a channel measurement associated with the CMR, performing an interference measurement associated with the IMR, and determining the size of the guard band based at least in part on the interference measurement.

In a thirty-sixth aspect, in combination with one or more of the twenty-ninth aspect through the thirty-fifth aspect, a first increase in the size of the guard band is associated with a first decrease in a downlink size associated with the second FD slot, and a second decrease in the size of the guard band is associated with a second increase in the downlink size.

In a thirty-seventh aspect, in combination with one or more of the twenty-ninth aspect through the thirty-sixth aspect, the second FD slot includes one downlink sub-band, and the downlink size corresponds to a particular quantity of resources minus a quantity of resources associated with the guard band.

In a thirty-eighth aspect, in combination with one or more of the twenty-ninth aspect through the thirty-seventh aspect, the second FD slot includes two downlink sub-bands, and the downlink size corresponds to a particular quantity of resources minus a quantity of resources associated with the guard band times two.

In a thirty-ninth aspect, in combination with one or more of the twenty-ninth aspect through the thirty-eighth aspect, the UE operates based on a wireless communication protocol that specifies a plurality of values representing sizes of the guard band, and the method further includes selecting a particular value from the plurality of values as the indication of the size of the guard band.

In a fortieth aspect, in combination with one or more of the twenty-ninth aspect through the thirty-ninth aspect, the method further includes receiving a control message indicating a plurality of guard band configurations for the UE and selecting a particular guard band configuration from the plurality of guard band configurations as the indication of the size of the guard band.

In a forty-first aspect, in combination with one or more of the twenty-ninth aspect through the fortieth aspect, the UE is configured with a plurality of values representing sizes of the guard band, and the indication corresponds to a particular value of the plurality of values.

In a forty-second aspect, in combination with one or more of the twenty-ninth aspect through the forty-first aspect, the UE is configured with a range of values representing sizes of the guard band, and the indication corresponds to a particular value within the range of values.

In a forty-third aspect, in combination with one or more of the twenty-ninth aspect through the forty-second aspect, the UE transmits the measurement report after a threshold time interval, and the threshold time interval is greater than each threshold time interval in a first group of threshold time intervals associated with a first latency characteristic.

In a forty-fourth aspect, in combination with one or more of the twenty-ninth aspect through the forty-third aspect, the threshold time interval is selected from a second group of threshold time intervals associated with a second latency characteristic greater than the first latency characteristic or from a third group of threshold time intervals associated with beam reporting.

In a forty-fifth aspect, in combination with one or more of the twenty-ninth aspect through the forty-fourth aspect, the method includes selecting among the second group and the third group based on one or more of channel state information (CSI) reporting quantity associated with the measurement report or a reporting type associated with the measurement report.

In a forty-sixth aspect, in combination with one or more of the twenty-ninth aspect through the forty-fifth aspect, the threshold time interval is selected from a third group of threshold time intervals associated with guard band reporting.

In a forty-seventh aspect, in combination with one or more of the twenty-ninth aspect through the forty-sixth aspect, the UE operates based on a wireless communication protocol that specifies the third group.

In a forty-eighth aspect, in combination with one or more of the twenty-ninth aspect through the forty-seventh aspect, the third group is based on a UE capability associated with the UE.

In a forty-ninth aspect, in combination with one or more of the twenty-ninth aspect through the forty-eighth aspect, the method further includes receiving a control message configuring the UE with multiple sizes of the guard band, and the measurement report indicates multiple cross-link interference (CLI) leakage measurements associated with the multiple sizes of the guard band.

In a fiftieth aspect, in combination with one or more of the twenty-ninth aspect through the forty-ninth aspect, the method further includes reporting multiple cross-link interference (CLI) measurements, and the multiple CLI measurements include a CLI measurement associated with an uplink sub-band of the first FD slot and further include a CLI leakage measurement associated with a downlink sub-band of the first FD slot.

In a fifty-first aspect, in combination with one or more of the twenty-ninth aspect through the fiftieth aspect, the second FD slot includes a downlink resource allocation that is based on the CLI leakage measurement, and an uplink transmit power of the UE or another UE is adjusted based on the CLI measurement.

In a fifty-second aspect, in combination with one or more of the twenty-ninth aspect through the fifty-first aspect, the multiple CLI measurements are reported either via the measurement report or via multiple measurement reports including the measurement report.

In a fifty-third aspect, in combination with one or more of the twenty-ninth aspect through the fifty-second aspect, the method further includes performing a cross-link interference (CLI) measurement based on an uplink sub-band portion of the first FD slot and reporting whether the UE detects an automatic gain control (AGC) blocking condition based on the CLI measurement.

In a fifty-fourth aspect, in combination with one or more of the twenty-ninth aspect through the fifty-third aspect, the measurement report includes a field having one of a first value or a second value. The first value indicates that the UE detects the AGC blocking condition, and the second value indicates that the UE fails to detect the AGC blocking condition.

In a fifty-fifth aspect, in combination with one or more of the twenty-ninth aspect through the fifty-fourth aspect, the AGC blocking condition is reported via one or more of a cross link interference (CLI) received signal strength indicator (RSSI) associated with an uplink sub-band of the first FD slot, a dynamic range reduction, a quantization noise ratio (QNR), or a difference in received power between the uplink sub-band and a downlink sub-band of the first FD slot.

In a fifty-sixth aspect, in combination with one or more of the twenty-ninth aspect through the fifty-fifth aspect, the reporting is performed either via the measurement report or via multiple measurement reports including the measurement report.

In a fifty-seventh aspect, an apparatus for wireless communication by a network device includes a transmitter. The apparatus further includes a receiver configured to receive a measurement report that is based on one or more measurements associated with a first FD slot. The measurement report includes an indication of a size of a guard band associated with a second FD slot that is subsequent to the first FD slot. One or more of the transmitter or the receiver are further configured to perform a wireless communication operation associated with the second FD slot, and the second FD slot includes a guard band having the size.

In a fifty-eighth aspect, in combination with the fifty-seventh aspect, the measurement report is based on a channel state information (CSI) reference signal (CSI-RS), and the measurement report corresponds to a CSI measurement report.

In a fifty-ninth aspect, in combination with one or more of the fifty-seventh aspect through the fifty-eighth aspect, the measurement report is based on a cross-link interference (CLI) reference signal (CLI-RS), and the measurement report corresponds to a CLI measurement report.

In a sixtieth aspect, in combination with one or more of the fifty-seventh aspect through the fifty-ninth aspect, the indication of the size of the guard band is separate from other parameters indicated by the measurement report.

In a sixty-first aspect, in combination with one or more of the fifty-seventh aspect through the sixtieth aspect, the measurement report indicates at least one other parameter, and the indication of the size of the guard band is reported with the at least one other parameter.

In a sixty-second aspect, in combination with one or more of the fifty-seventh aspect through the sixty-first aspect, the measurement report further indicates channel measurement resources (CMR).

In a sixty-third aspect, in combination with one or more of the fifty-seventh aspect through the sixty-second aspect, the measurement report further indicates channel measurement resources (CMR) and interference measurement resources (IMR).

In a sixty-fourth aspect, in combination with one or more of the fifty-seventh aspect through the sixty-third aspect, a first increase in the size of the guard band is associated with a first decrease in a downlink size associated with the second FD slot, and a second decrease in the size of the guard band is associated with a second increase in the downlink size.

In a sixty-fifth aspect, in combination with one or more of the fifty-seventh aspect through the sixty-fourth aspect, the second FD slot includes one downlink sub-band, and the downlink size corresponds to a particular quantity of resources minus a quantity of resources associated with the guard band.

In a sixty-sixth aspect, in combination with one or more of the fifty-seventh aspect through the sixty-fifth aspect, the second FD slot includes two downlink sub-bands, and the downlink size corresponds to a particular quantity of resources minus a quantity of resources associated with the guard band times two.

In a sixty-seventh aspect, in combination with one or more of the fifty-seventh aspect through the sixty-sixth aspect, the transmitter and the receiver are further configured to operate based on a wireless communication protocol that specifies a plurality of values representing sizes of the guard band, and a particular value of the plurality of values corresponds to the indication of the size of the guard band.

In a sixty-eighth aspect, in combination with one or more of the fifty-seventh aspect through the sixty-seventh aspect, the transmitter is further configured to transmit a control message indicating a plurality of guard band configurations, and a particular guard band configuration from the plurality of guard band configurations corresponds to the indication of the size of the guard band.

In a sixty-ninth aspect, in combination with one or more of the fifty-seventh aspect through the sixty-eighth aspect, the transmitter is further configured to transmit a configuration of a plurality of values representing sizes of the guard band, and the indication corresponds to a particular value of the plurality of values.

In a seventieth aspect, in combination with one or more of the fifty-seventh aspect through the sixty-ninth aspect, the transmitter is further configured to transmit a range of values representing sizes of the guard band, and the indication corresponds to a particular value within the range of values.

In a seventy-first aspect, in combination with one or more of the fifty-seventh aspect through the seventieth aspect, the receiver is further configured to receive the measurement report after a threshold time interval, and the threshold time interval is greater than each threshold time interval in a first group of threshold time intervals associated with a first latency characteristic.

In a seventy-second aspect, in combination with one or more of the fifty-seventh aspect through the seventy-first aspect, the threshold time interval is included in a second group of threshold time intervals associated with a second latency characteristic greater than the first latency characteristic or in a third group of threshold time intervals associated with beam reporting.

In a seventy-third aspect, in combination with one or more of the fifty-seventh aspect through the seventy-second aspect, one of the second group or the third group is selected based on one or more of channel state information (CSI) reporting quantity associated with the measurement report or a reporting type associated with the measurement report.

In a seventy-fourth aspect, in combination with one or more of the fifty-seventh aspect through the seventy-third aspect, the threshold time interval is included in a third group of threshold time intervals associated with guard band reporting.

In a seventy-fifth aspect, in combination with one or more of the fifty-seventh aspect through the seventy-fourth aspect, the transmitter and the receiver are further configured to operate based on a wireless communication protocol that specifies the third group.

In a seventy-sixth aspect, in combination with one or more of the fifty-seventh aspect through the seventy-fifth aspect, the third group is based on a user equipment (UE) capability associated with a UE.

In a seventy-seventh aspect, in combination with one or more of the fifty-seventh aspect through the seventy-sixth aspect, the transmitter is further configured to transmit a control message indicating multiple sizes of the guard band, and the measurement report indicates multiple cross-link interference (CLI) leakage measurements associated with the multiple sizes of the guard band.

In a seventy-eighth aspect, in combination with one or more of the fifty-seventh aspect through the seventy-seventh aspect, the receiver is further configured to receive reporting of multiple cross-link interference (CLI) measurements, and the multiple CLI measurements include a CLI measurement associated with an uplink sub-band of the first FD slot and further include a CLI leakage measurement associated with a downlink sub-band of the first FD slot.

In a seventy-ninth aspect, in combination with one or more of the fifty-seventh aspect through the seventy-eighth aspect, the second FD slot includes a downlink resource allocation that is based on the CLI leakage measurement, and an uplink transmit power of a user equipment (UE) is adjusted based on the CLI measurement.

In a eightieth aspect, in combination with one or more of the fifty-seventh aspect through the seventy-ninth aspect, the receiver is further configured receive the reporting of the multiple CLI measurements either via the measurement report or via multiple measurement reports including the measurement report.

In a eighty-first aspect, in combination with one or more of the fifty-seventh aspect through the eightieth aspect, the receiver is further configured to receive a reporting of whether an automatic gain control (AGC) blocking condition is detected by a user equipment (UE) based on a cross-link interference (CLI) measurement, and the CLI measurement is based on an uplink sub-band portion of the first FD slot.

In a eighty-second aspect, in combination with one or more of the fifty-seventh aspect through the eighty-first aspect, the measurement report includes a field having one of a first value or a second value. The first value indicates that the UE detects the AGC blocking condition, and the second value indicates that the UE fails to detect the AGC blocking condition.

In a eighty-third aspect, in combination with one or more of the fifty-seventh aspect through the eighty-second aspect, the receiver is further configured to receive the reporting via one or more of a cross link interference (CLI) received signal strength indicator (RSSI) associated with an uplink sub-band of the first FD slot, a dynamic range reduction, a quantization noise ratio (QNR), or a difference in received power between the uplink sub-band and a downlink sub-band of the first FD slot.

In a eighty-fourth aspect, in combination with one or more of the fifty-seventh aspect through the eighty-third aspect, the receiver is further configured to receive the reporting either via the measurement report or via multiple measurement reports including the measurement report.

In a eighty-fifth aspect, a method of wireless communication performed by a network device includes receiving a measurement report that is based on one or more measurements associated with a first FD slot. The measurement report includes an indication of a size of a guard band associated with a second FD slot that is subsequent to the first FD slot. The method further includes performing a wireless communication operation associated with the second FD slot. The second FD slot includes a guard band having the size.

In a eighty-sixth aspect, in combination with the eighty-fifth aspect, the measurement report is based on a channel state information (CSI) reference signal (CSI-RS), and the measurement report corresponds to a CSI measurement report.

In a eighty-seventh aspect, in combination with one or more of the eighty-fifth aspect through the eighty-sixth aspect, the measurement report is based on a cross-link interference (CLI) reference signal (CLI-RS), and the measurement report corresponds to a CLI measurement report.

In a eighty-eighth aspect, in combination with one or more of the eighty-fifth aspect through the eighty-seventh aspect, the indication of the size of the guard band is separate from other parameters indicated by the measurement report.

In a eighty-ninth aspect, in combination with one or more of the first through the eighty-eighth aspect, the measurement report indicates at least one other parameter, and the indication of the size of the guard band is reported with the at least one other parameter.

In a ninetieth aspect, in combination with one or more of the eighty-fifth aspect through the eighty-ninth aspect, the measurement report further indicates channel measurement resources (CMR).

In a ninety-first aspect, in combination with one or more of the eighty-fifth aspect through the ninetieth aspect, the measurement report further indicates channel measurement resources (CMR) and interference measurement resources (IMR).

In a ninety-second aspect, in combination with one or more of the eighty-fifth aspect through the ninety-first aspect, a first increase in the size of the guard band is associated with a first decrease in a downlink size associated with the second FD slot, and a second decrease in the size of the guard band is associated with a second increase in the downlink size.

In a ninety-third aspect, in combination with one or more of the eighty-fifth aspect through the ninety-second aspect, the second FD slot includes one downlink sub-band, and the downlink size corresponds to a particular quantity of resources minus a quantity of resources associated with the guard band.

In a ninety-fourth aspect, in combination with one or more of the eighty-fifth aspect through the ninety-third aspect, the second FD slot includes two downlink sub-bands, and the downlink size corresponds to a particular quantity of resources minus a quantity of resources associated with the guard band times two.

In a ninety-fifth aspect, in combination with one or more of the eighty-fifth aspect through the ninety-fourth aspect, the network device operates based on a wireless communication protocol that specifies a plurality of values representing sizes of the guard band, and a particular value of the plurality of values corresponds to the indication of the size of the guard band.

In a ninety-sixth aspect, in combination with one or more of the eighty-fifth aspect through the ninety-fifth aspect, the method further includes transmitting a control message indicating a plurality of guard band configurations, and a particular guard band configuration from the plurality of guard band configurations corresponds to the indication of the size of the guard band.

In a ninety-seventh aspect, in combination with one or more of the eighty-fifth aspect through the ninety-sixth aspect, the method further includes transmitting a configuration of a plurality of values representing sizes of the guard band, and the indication corresponds to a particular value of the plurality of values.

In a ninety-eighth aspect, in combination with one or more of the eighty-fifth aspect through the ninety-seventh aspect, the method further includes transmitting a range of values representing sizes of the guard band, and the indication corresponds to a particular value within the range of values.

In a ninety-ninth aspect, in combination with one or more of the eighty-fifth aspect through the ninety-eighth aspect, the method further includes receiving the measurement report after a threshold time interval, and the threshold time interval is greater than each threshold time interval in a first group of threshold time intervals associated with a first latency characteristic.

In a one-hundredth aspect, in combination with one or more of the eighty-fifth aspect through the ninety-ninth aspect, the method further includes the threshold time interval is included in a second group of threshold time intervals associated with a second latency characteristic greater than the first latency characteristic or in a third group of threshold time intervals associated with beam reporting.

In a one-hundred-and-first aspect, in combination with one or more of the eighty-fifth aspect through the one-hundredth aspect, one of the second group or the third group is selected based on one or more of channel state information (CSI) reporting quantity associated with the measurement report or a reporting type associated with the measurement report.

In a one-hundred-and-second aspect, in combination with one or more of the eighty-fifth aspect through the one-hundred-and-first aspect, the threshold time interval is included in a third group of threshold time intervals associated with guard band reporting.

In a one-hundred-and-third aspect, in combination with one or more of the eighty-fifth aspect through the one-hundred-and-second aspect, the network device operates based on a wireless communication protocol that specifies the third group.

In a one-hundred-and-fourth aspect, in combination with one or more of the eighty-fifth aspect through the one-hundred-and-third aspect, the third group is based on a user equipment (UE) capability associated with a UE.

In a one-hundred-and-fifth aspect, in combination with one or more of the eighty-fifth aspect through the one-hundred-and-fourth aspect, the method further includes transmitting a control message indicating multiple sizes of the guard band, and the measurement report indicates multiple cross-link interference (CLI) leakage measurements associated with the multiple sizes of the guard band.

In a one-hundred-and-sixth aspect, in combination with one or more of the eighty-fifth aspect through the one-hundred-and-fifth aspect, the method further includes receiving reporting of multiple cross-link interference (CLI) measurements, the multiple CLI measurements include a CLI measurement associated with an uplink sub-band of the first FD slot and further include a CLI leakage measurement associated with a downlink sub-band of the first FD slot.

In a one-hundred-and-seventh aspect, in combination with one or more of the eighty-fifth aspect through the one-hundred-and-sixth aspect, the second FD slot includes a downlink resource allocation that is based on the CLI leakage measurement, and an uplink transmit power of a user equipment (UE) is adjusted based on the CLI measurement.

In a one-hundred-and-eighth aspect, in combination with one or more of the eighty-fifth aspect through the one-hundred-and-seventh aspect, receiving the reporting of the multiple CLI measurements either via the measurement report or via multiple measurement reports including the measurement report.

In a one-hundred-and-ninth aspect, in combination with one or more of the eighty-fifth aspect through the one-hundred-and-eighth aspect, the method further includes receiving a reporting of whether an automatic gain control (AGC) blocking condition is detected by a user equipment (UE) based on a cross-link interference (CLI) measurement, and the CLI measurement is based on an uplink sub-band portion of the first FD slot.

In a one-hundred-and-tenth aspect, in combination with one or more of the eighty-fifth aspect through the one-hundred-and-ninth aspect, the measurement report includes a field having one of a first value or a second value. The first value indicates that the UE detects the AGC blocking condition, and the second value indicates that the UE fails to detect the AGC blocking condition.

In a one-hundred-and-eleventh aspect, in combination with one or more of the eighty-fifth aspect through the one-hundred-and-tenth aspect, the reporting is received via one or more of a cross link interference (CLI) received signal strength indicator (RSSI) associated with an uplink sub-band of the first FD slot, a dynamic range reduction, a quantization noise ratio (QNR), or a difference in received power between the uplink sub-band and a downlink sub-band of the first FD slot.

In a one-hundred-and-twelfth aspect, in combination with one or more of the eighty-fifth aspect through the one-hundred-and-eleventh aspect, the reporting is received either via the measurement report or via multiple measurement reports including the measurement report.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

One or more illustrative logics, logical blocks, modules, circuits, and operations described in herein may be implemented as electronic hardware, computer software, or combinations of both. Features described herein may be described generally, in terms of functionality, and illustrated in the various illustrative components, blocks, modules, circuits, and processes described above. Whether such functionality is implemented in hardware or software may depend upon the particular application and design of the overall system.

A hardware and data processing apparatus used to implement the various illustrative logics, logical blocks, modules and circuits described herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The operations of a method or process disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication by a user equipment (UE), the apparatus comprising:
- at least one memory; and
- at least one processor coupled to the at least one memory and, based at least in part on information stored in the at least one memory, the at least one processor is configured to cause the apparatus to:
- receive a reference signal that is associated with a first full duplex (FD) slot;
- perform a channel measurement associated with channel measurement resources (CMR);
- perform an interference measurement based on the channel measurement or based on a measurement associated with interference measurement resources (IMR);
- determine a size of a guard band based at least in part on the interference measurement; and
- transmit a measurement report that is associated with the reference signal, the measurement report including an indication of the size of the guard band associated with a second FD slot that is subsequent to the first FD slot.

2. The apparatus of claim 1, wherein the reference signal corresponds to a channel state information (CSI) reference signal (CSI-RS), and wherein the measurement report corresponds to a CSI measurement report.

3. The apparatus of claim 1, wherein the reference signal corresponds to a cross-link interference (CLI) reference signal (CLI-RS), and wherein the measurement report corresponds to a CLI measurement report.

4. The apparatus of claim 1, wherein the indication of the size of the guard band is separate from other parameters indicated by the measurement report.

5. The apparatus of claim 1, wherein the measurement report indicates at least one other parameter, and wherein the indication of the size of the guard band is reported with the at least one other parameter.

6. The apparatus of claim 1, wherein the measurement report further indicates the CMR and wherein the processor is configured to perform the interference measurement based on the channel measurement.

7. The apparatus of claim 1, wherein the measurement report further indicates the CMR and the IMR and wherein the processor is configured to perform the interference measurement associated with the IMR.

8. The apparatus of claim 1, wherein a first increase in the size of the guard band is associated with a first decrease in a downlink size associated with the second FD slot, and wherein a second decrease in the size of the guard band is associated with a second increase in the downlink size.

9. The apparatus of claim 8, wherein the second FD slot includes one downlink sub-band, and wherein the downlink size corresponds to a particular quantity of resources minus a quantity of resources associated with the guard band.

10. The apparatus of claim 8, wherein the second FD slot includes two downlink sub-bands, and wherein the downlink size corresponds to a particular quantity of resources minus a quantity of resources associated with the guard band times two.

11. A method of wireless communication performed by a user equipment (UE), the method comprising:
- receiving a reference signal that is associated with a first full duplex (FD) slot;
- performing a channel measurement associated with channel measurement resources (CMR);
- performing an interference measurement based on the channel measurement or based on a measurement associated with interference measurement resources (IMR); and
- determining a size of a guard band based at least in part on the interference measurement; and
- transmitting a measurement report that is associated with the reference signal, the measurement report including an indication of the size of the guard band associated with a second FD slot that is subsequent to the first FD slot.

12. The method of claim 11, wherein the UE operates based on a wireless communication protocol that specifies a plurality of values representing sizes of the guard band, and further comprising selecting a particular value from the plurality of values as the indication of the size of the guard band.

13. The method of claim 11, further comprising:
- receiving a control message indicating a plurality of guard band configurations for the UE; and
- selecting a particular guard band configuration from the plurality of guard band configurations as the indication of the size of the guard band, wherein the determining the size of the guard band comprises the selecting the particular guard band configuration.

14. The method of claim 11, wherein the UE is configured with a plurality of values representing sizes of the guard band, and wherein the indication corresponds to a particular value of the plurality of values.

15. The method of claim 11, wherein the UE is configured with a range of values representing sizes of the guard band, and wherein the indication corresponds to a particular value within the range of values.

16. The method of claim 11, wherein the UE transmits the measurement report after a threshold time interval, and wherein the threshold time interval is greater than each threshold time interval in a first group of threshold time intervals associated with a first latency characteristic.

17. The method of claim 16, wherein the threshold time interval is selected from a second group of threshold time intervals associated with a second latency characteristic greater than the first latency characteristic or from a third group of threshold time intervals associated with beam reporting, and further comprising selecting among the second group and the third group based on one or more of channel state information (CSI) reporting quantity associated with the measurement report or a reporting type associated with the measurement report.

18. The method of claim 16, wherein the threshold time interval is selected from a third group of threshold time intervals associated with guard band reporting.

19. The method of claim 18, wherein the UE operates based on a wireless communication protocol that specifies the third group.

20. The method of claim 18, wherein the third group is based on a UE capability associated with the UE.

21. An apparatus for wireless communication by a network device, the apparatus comprising:

at least one memory; and at least one processor coupled to the at least one memory and, based at least in part on information stored in the at least one memory, the at least one processor is configured to cause the apparatus to:

receive a measurement report that is based on one or more measurements associated with a first full duplex (FD) slot, the measurement report including an indication of a size of a guard band associated with a second FD slot that is subsequent to the first FD slot, wherein the measurement report includes an indication a cross-link interference (CLI) measurement; and perform a wireless communication operation associated with the second FD slot, the second FD slot including a guard band having the size.

22. The apparatus of claim 21, wherein, based at least in part on information stored in the at least one memory, the at least one processor is further configured to cause the apparatus to transmit a control message indicating multiple sizes of the guard band, and wherein the measurement report indicates multiple CLI leakage measurements associated with the multiple sizes of the guard band, the multiple CLI leakage measurements comprising the CLI measurement.

23. The apparatus of claim 21, wherein the measurement report includes reporting of multiple CLI measurements comprising the CLI measurement, and wherein the multiple CLI measurements include a CLI measurement associated with an uplink sub-band of the first FD slot and further include a CLI leakage measurement associated with a downlink sub-band of the first FD slot.

24. The apparatus of claim 23, wherein the second FD slot includes a downlink resource allocation that is based on the CLI leakage measurement, and wherein an uplink transmit power of a user equipment (UE) is adjusted based on the CLI measurement associated with an uplink sub-band of the first FD slot.

25. The apparatus of claim 23, wherein, based at least in part on information stored in the at least one memory, the at least one processor is further configured to cause the apparatus to receive the reporting of the multiple CLI measurements either via the measurement report or via multiple measurement reports including the measurement report.

26. A method of wireless communication performed by a network device, the method comprising:

receiving a measurement report that is based on one or more measurements associated with a first full duplex (FD) slot, the measurement report including an indication of a size of a guard band associated with a second FD slot that is subsequent to the first FD slot, wherein the measurement report includes an indication of a cross-link interference (CLI) measurement; and performing a wireless communication operation associated with the second FD slot, the second FD slot including a guard band having the size.

27. The method of claim 26, further comprising receiving a reporting of whether an automatic gain control (AGC) blocking condition is detected by a user equipment (UE) based on the CLI measurement, wherein the CLI measurement is based on an uplink sub-band portion of the first FD slot.

28. The method of claim 27, wherein the measurement report includes a field having one of a first value or a second value, wherein the first value indicates that the UE detects the AGC blocking condition, and wherein the second value indicates that the UE fails to detect the AGC blocking condition.

29. The method of claim 27, wherein the reporting is received via one or more of a CLI received signal strength indicator (RSSI) associated with an uplink sub-band of the first FD slot, a dynamic range reduction, a quantization noise ratio (QNR), or a difference in received power between the uplink sub-band and a downlink sub-band of the first FD slot.

30. The method of claim 27, wherein the reporting is received either via the measurement report or via multiple measurement reports including the measurement report.

* * * * *